(12) United States Patent
Tomioka

(10) Patent No.: US 9,850,973 B2
(45) Date of Patent: Dec. 26, 2017

(54) TRACTOR

(71) Applicant: ISEKI & CO., LTD., Ehime-Ken (JP)

(72) Inventor: Eiji Tomioka, Ehime-Ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 183 days.

(21) Appl. No.: 14/819,901

(22) Filed: Aug. 6, 2015

(65) Prior Publication Data
US 2016/0039283 A1    Feb. 11, 2016

(30) Foreign Application Priority Data
Aug. 8, 2014 (JP) ................................. 2014-162836

(51) Int. Cl.
| B60K 20/02 | (2006.01) |
| F16D 67/00 | (2006.01) |
| B60K 20/04 | (2006.01) |
| B60K 26/02 | (2006.01) |

(52) U.S. Cl.
CPC .............. *F16D 67/00* (2013.01); *B60K 20/04* (2013.01); *B60K 26/02* (2013.01); *B60Y 2200/221* (2013.01)

(58) Field of Classification Search
CPC .......... B60K 20/04; B60K 23/00; F16D 67/00
See application file for complete search history.

(56) References Cited

U.S. PATENT DOCUMENTS

| 2002/0043057 A1* | 4/2002 | Shiba ................... B60K 5/1208 56/1 |
| 2006/0081084 A1* | 4/2006 | Nishino ................ B60K 20/04 74/473.1 |
| 2009/0252586 A1* | 10/2009 | Sumiyoshi ............. B60T 1/062 414/685 |
| 2010/0101887 A1* | 4/2010 | Kawashiri ............... F02D 11/02 180/335 |
| 2011/0203868 A1* | 8/2011 | Toyokawa .............. F16H 59/06 180/367 |

FOREIGN PATENT DOCUMENTS

JP    2013-181553 A    9/2013

* cited by examiner

*Primary Examiner* — Ramya Burgess
*Assistant Examiner* — Lillian Nguyen
(74) *Attorney, Agent, or Firm* — Bacon & Thomas, PLLC (57) ABSTRACT

A tractor, including: a link mechanism fixation-member which regulates rotation of the HST trunnion shaft by abutting the link mechanism; a link mechanism fixation-member operation lever which makes the link mechanism fixation-member about the link mechanism, or makes the link mechanism fixation-member move in a direction so as to get apart from the link mechanism; a brake pedal which is provided at the other side of the left-and-right sides of the step floor; and a link mechanism joining-cancellation mechanism which makes, in a case where the link mechanism fixation-member is abutting the link mechanism, the link mechanism fixation-member move in a direction so as to get apart from the link mechanism when stepping-on of the brake pedal is performed.

6 Claims, 11 Drawing Sheets

TRACTOR

BACKGROUND OF THE INVENTION

Field of the Invention

The present invention relates to a tractor which performs working inside a farm field, for example.

Related Art of the Invention

Known is a tractor comprising a frontward/rearward movement pedal which is provided at the right side of the step floor, and having an auto-cruise function (for example, refer to Japanese Patent Application Publication No. 2013-181553).

Additionally, the frontward/rearward movement pedal is a seesaw-type pedal, for example, for switching the frontward movement and rearward movement of the vehicle.

Moreover, the auto-cruise function is a function of maintaining the outputting of the HST (Hydro Static Transmission) regardless of the stepping-on operations of the frontward/rearward movement pedal, and suppressing the fluctuation of the vehicle traveling-speed.

A worker can reduce fatigue utilizing an auto-cruise function like this.

SUMMARY OF THE INVENTION

However, in the conventional tractor mentioned above, a controller controls the HST trunnion motor for changing the HST trunnion opening-degree.

Additionally, the controller switches the execution and the cancellation of the auto-cruise function based on ON/OFF of the auto-cruise switch which is operated by the worker.

Because of this, in the conventional tractor, it is necessary for the worker to expressly operate, even on the occasion of performing a pedal operation of the brake pedal for the purpose of emergency stopping or the like, the auto-cruise switch for canceling the auto-cruise function, and cancellation of the auto-cruise function has been bothersome.

The present invention furnishes, in consideration of the conventional problem mentioned above, a tractor for which cancellation of the auto-cruise function is able to be performed with a simpler operation.

The $1^{st}$ aspect of the present invention is a tractor, comprising:

an HST;

a frontward/rearward movement pedal which is connected to an HST trunnion shaft of the HST, and is provided at one side of left-and-right sides of a step floor;

a link mechanism which is provided at other side of the left-and-right sides of the step floor;

a frontward/rearward movement pedal rotation-shaft which extends in a left-and-right direction below the step floor, with both end parts of the frontward/rearward movement pedal rotation-shaft being respectively connected to the frontward/rearward movement pedal and the link mechanism, and rotates in correspondence to swinging of the frontward/rearward movement pedal;

a link mechanism fixation-member which regulates rotation of the HST trunnion shaft by abutting the link mechanism;

a link mechanism fixation-member operation lever which makes the link mechanism fixation-member abut the link mechanism, or makes the link mechanism fixation-member move in a direction so as to get apart from the link mechanism;

a brake pedal which is provided at the other side of the left-and-right sides of the step floor; and a link mechanism joining-cancellation mechanism which makes, in a case where the link mechanism fixation-member is abutting the link mechanism, the link mechanism fixation-member move in a direction so as to get apart from the link mechanism when stepping-on of the brake pedal is performed.

By means of this, since when stepping-on of the brake pedal is performed, the link mechanism fixation-member is made to move in a direction so as to get apart from the link mechanism, cancellation of the auto-cruise function is able to be performed with a simpler operation.

The $2^{nd}$ aspect of the present invention is the tractor according to the $1^{st}$ aspect of the present invention, wherein the link mechanism fixation-member, the link mechanism fixation-member operation lever, and the link mechanism joining-cancellation mechanism are provided at the other side of the left-and-right sides of the step floor.

By means of this, since the link mechanism fixation-member, the link mechanism fixation-member operation lever, and the link mechanism joining-cancellation mechanism are provided at the other side of the left-and-right sides of the step floor, a compact machine-body layout is able to be realized.

The $3^{rd}$ aspect of the present invention is the tractor according to the $1^{st}$ aspect of the present invention, wherein the link mechanism joining-cancellation mechanism comprises a link mechanism joining-cancellation plate which makes, by abutting the link mechanism fixation-member, the link mechanism fixation-member move in a direction so as to get apart from the link mechanism when stepping-on of the brake pedal is performed.

By means of this, since a link mechanism joining-cancellation plate is comprised which makes, by abutting the link mechanism fixation-member, the link mechanism fixation-member move in a direction so as to get apart from the link mechanism, cancellation of the auto-cruise function is able to be performed with a more simplified configuration.

The $4^{th}$ aspect of the present invention is the tractor according to the $3^{rd}$ aspect of the present invention, wherein the brake pedal comprises a left brake pedal which corresponds to a brake of a vehicle-wheel at a left side, and a right brake pedal which corresponds to a brake of a vehicle-wheel at a right side, and the link mechanism joining-cancellation plate comprises a first plate corresponding to the left brake pedal, and a second plate corresponding to the right brake pedal.

By means of this, since a first plate corresponding to the left brake pedal, and a second plate corresponding to the right brake pedal are comprised, the auto-cruise function is able to be cancelled only by performing a pedal operation of at least one of the two brake pedals.

The $5^{th}$ aspect of the present invention is the tractor according to the $4^{th}$ aspect of the present invention, wherein the link mechanism fixation-member comprises an abutted part which is abutted by the link mechanism joining-cancellation plate, and the abutted part comprises a first abutted part which is abutted by the first plate, and a second abutted part which is abutted by the second plate.

By means of this, since a first abutted part which is abutted by the first plate, and a second abutted part which is abutted by the second plate are comprises, cancellation of the auto-cruise function is able to be more surely performed.

The $6^{th}$ aspect of the present invention is the tractor according to the $2^{nd}$ aspect of the present invention, wherein the link mechanism joining-cancellation mechanism comprises a link mechanism joining-cancellation plate which makes, by abutting the link mechanism fixation-member, the link mechanism fixation-member move in a direction so as to get apart from the link mechanism when stepping-on of the brake pedal is performed.

By means of this, since a link mechanism joining-cancellation plate is comprised which makes, by abutting the link mechanism fixation-member, the link mechanism fixation-member move in a direction so as to get apart from the link mechanism, cancellation of the auto-cruise function is able to be performed with a more simplified configuration.

The 7$^{th}$ aspect of the present invention is the tractor according to the 6$^{th}$ aspect of the present invention, wherein the brake pedal comprises a left brake pedal which corresponds to a brake of a vehicle-wheel at a left side, and a right brake pedal which corresponds to a brake of a vehicle-wheel at a right side, and the link mechanism joining-cancellation plate comprises a first plate corresponding to the left brake pedal, and a second plate corresponding to the right brake pedal.

By means of this, since a first plate corresponding to the left brake pedal, and a second plate corresponding to the right brake pedal are comprised, the auto-cruise function is able to be cancelled only by performing a pedal operation of at least one of the two brake pedals.

The 8$^{th}$ aspect of the present invention is the tractor according to the 7$^{th}$ aspect of the present invention, wherein the link mechanism fixation-member comprises an abutted part which is abutted by the link mechanism joining-cancellation plate, and the abutted part comprises a first abutted part which is abutted by the first plate, and a second abutted part which is abutted by the second plate.

By means of this, since a first abutted part which is abutted by the first plate, and a second abutted part which is abutted by the second plate are comprises, cancellation of the auto-cruise function is able to be more surely performed.

By the present invention, a tractor for which cancellation of the auto-cruise function is able to be performed with a simpler operation can be furnished.

DESCRIPTION OF SYMBOLS 1 bonnet
2 engine
3L, 3R front wheel
4L, 4R rear wheel
10 HST case
11 HST
12 HST trunnion shaft
13 HST trunnion arm
20 transmission case
31 driving seat
32 steering handle
33 operation column cover
34 dash panel
35 hose cover
40 step floor
50L, 50R brake pedal
51 brake pedal connector
52L, 52R return spring
60 frontward/rearward movement pedal
61 pedal base part
62 pedal stepping-on part
70 connection shaft
80 frontward/rearward movement pedal rotation-shaft
90 neutrality posture adjustment-mechanism
91 hub
92 neutrality plate
93 adjustment knob-member
100 link mechanism
101 arm
102 rod
103 cruise plate
104 rotation arm-member
105 plate
106 rod
107 upper-end plate
110 link mechanism fixation-member
111 joining plate
112L, 112R link mechanism joining-cancellation bearing
113 plate
120 link mechanism fixation-member operation lever
121 return spring
130 link mechanism joining-cancellation mechanism
131L, 131R link mechanism joining-cancellation plate

DETAILED DESCRIPTION OF THE INVENTION

In the following, referring to the drawings, descriptions are given in detail regarding embodiments in the present invention.

In the beginning, referring to FIGS. 1 to 5, descriptions are specifically given regarding the configuration and action of the tractor of the present embodiment.

Figure 1:
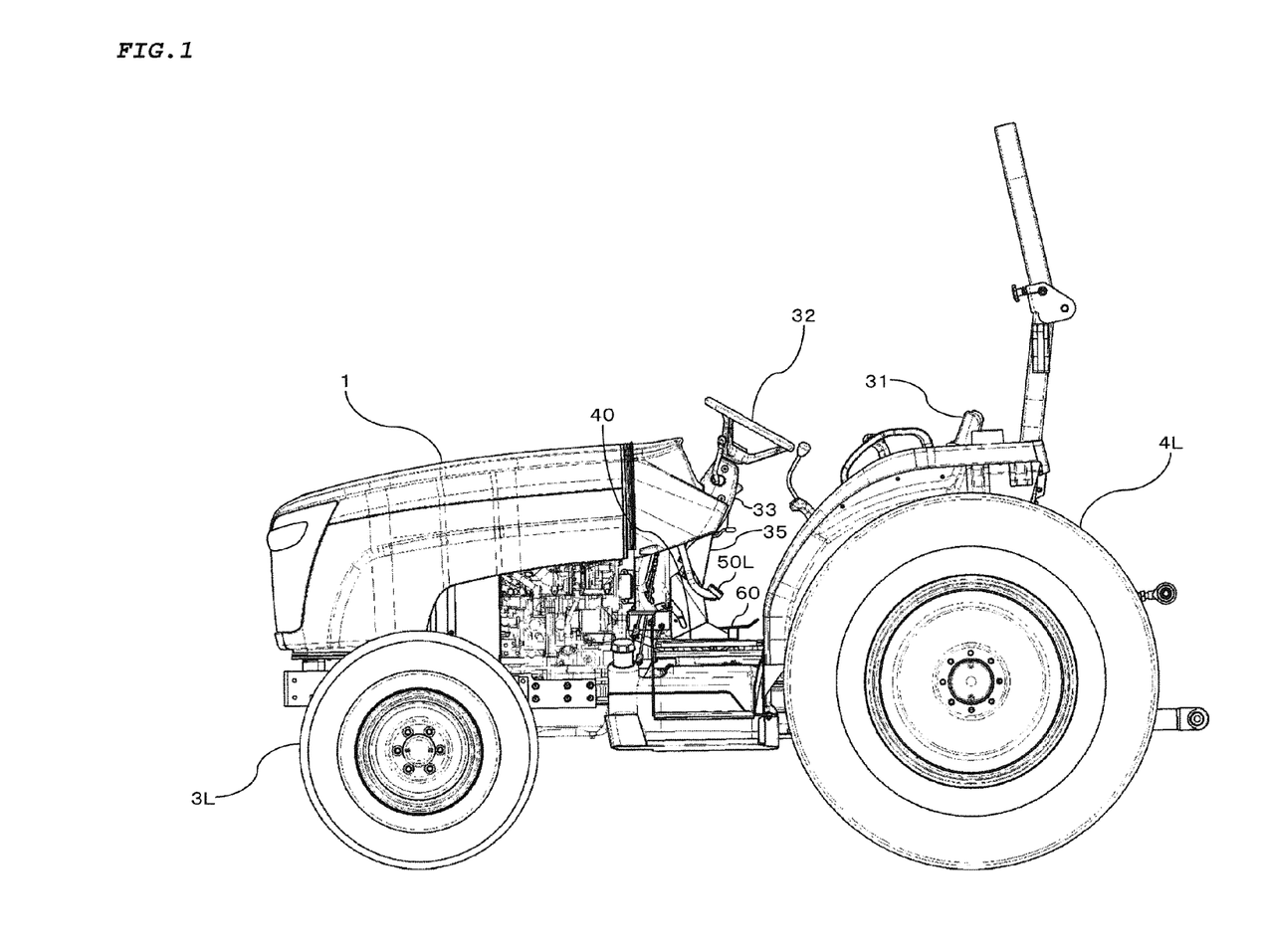
FIG. 1 is a left side view of the tractor of the embodiment in the present invention.
Figure 2:
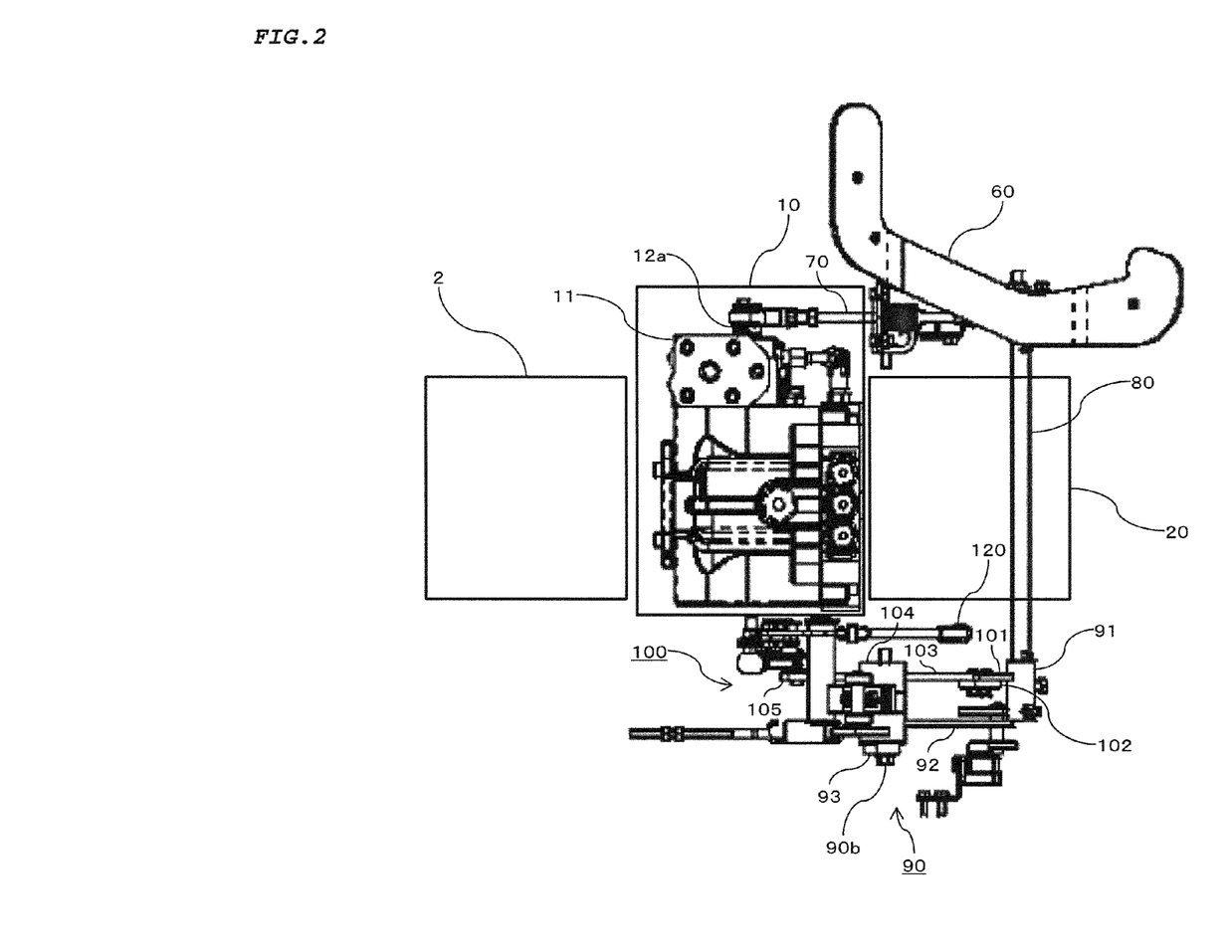
FIG. 2 is a partial top view of the neighborhood of the step floor of the tractor of the embodiment in the present invention.
Figure 3:
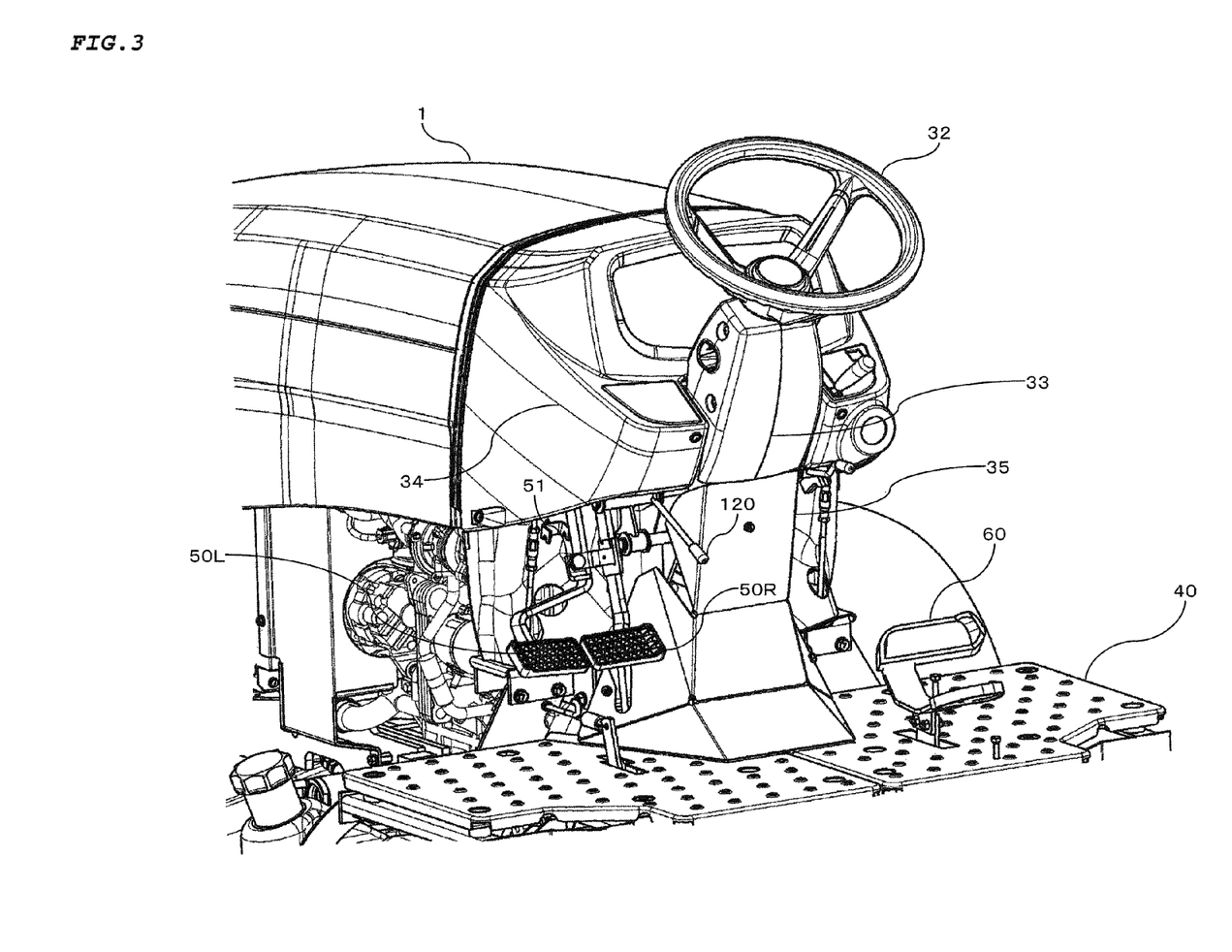
FIG. 3 is a partial perspective view (No. 1) of the neighborhood of the operation column cover of the tractor of the embodiment in the present invention.
Figure 4:
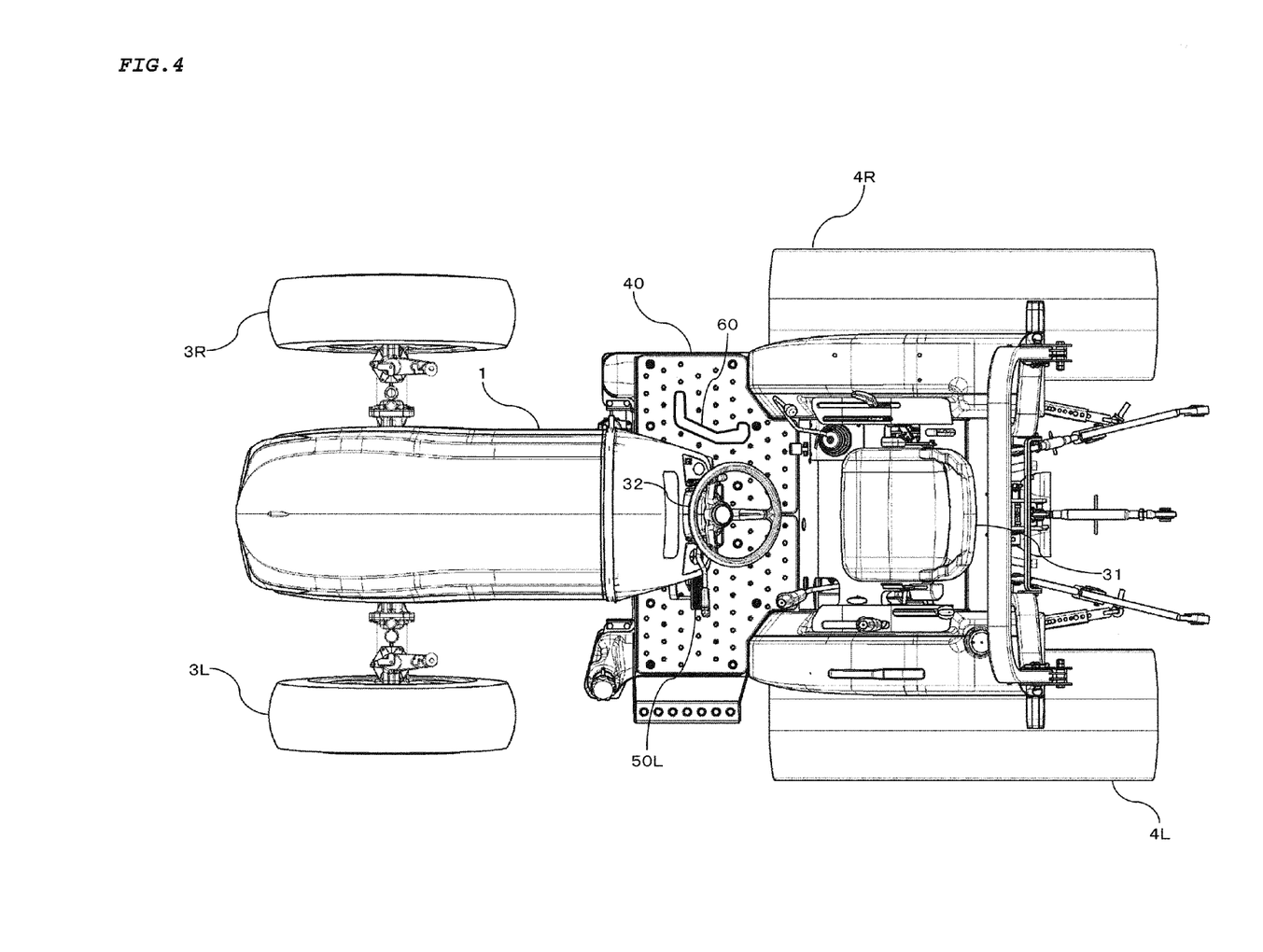
FIG. 4 is a top view of the tractor of the embodiment in the present invention.
Figure 5:
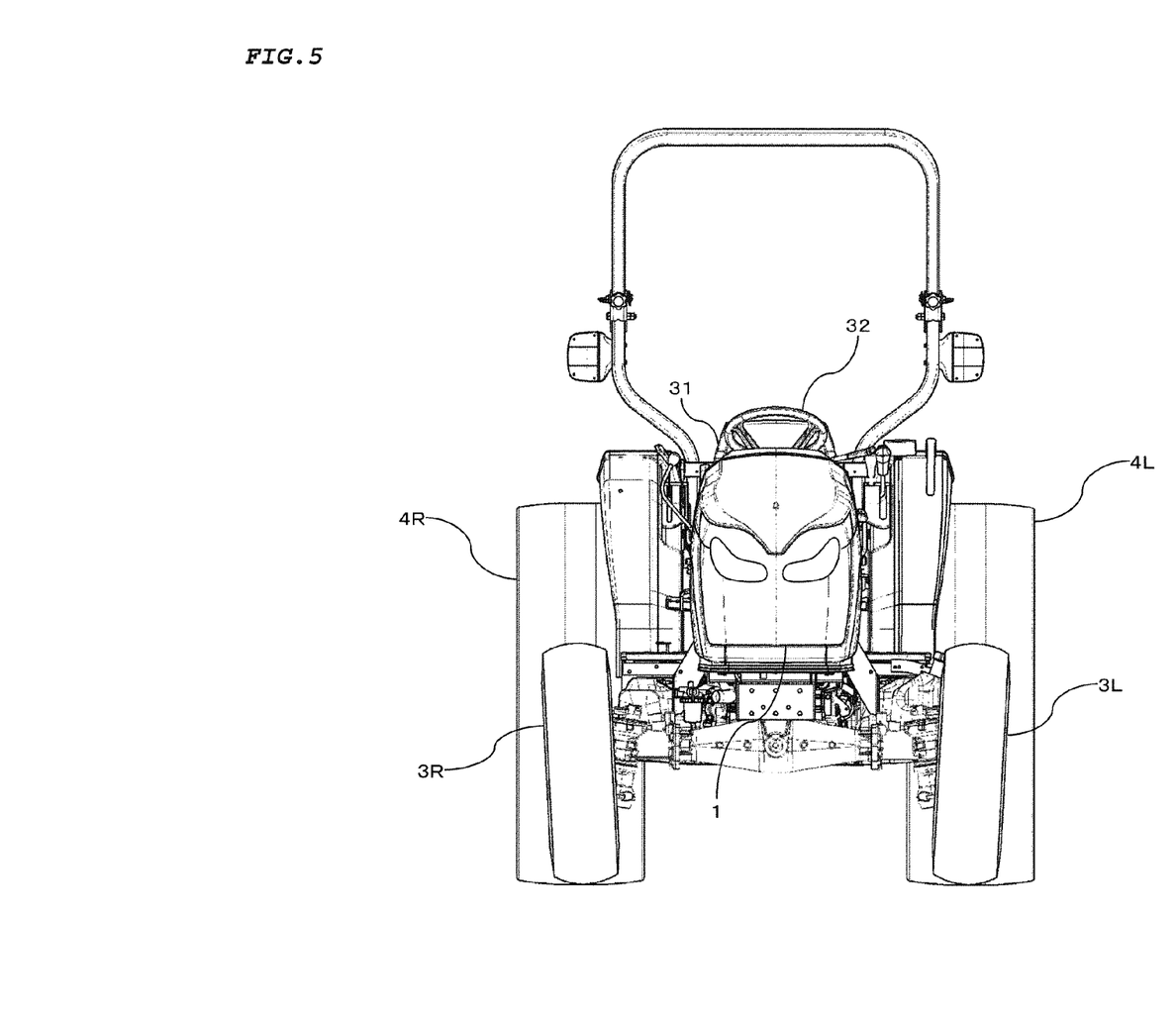
FIG. 5 is a front view of the tractor of the embodiment in the present invention.

Here, FIG. 1 is a left side view of the tractor of the embodiment in the present invention, FIG. 2 is a partial top view of the neighborhood of a step floor 40 of the tractor of the embodiment in the present invention, FIG. 3 is a partial perspective view (No. 1) of the neighborhood of an operation column cover 33 of the tractor of the embodiment in the present invention, FIG. 4 is a top view of the tractor of the embodiment in the present invention, and FIG. 5 is a front view of the tractor of the embodiment in the present invention.

Additionally, in FIG. 2, the step floor 40 and the like are not shown, so that descriptions in the following will become easier to understand.

In the inner part of a bonnet 1 of the vehicle-body front part, an engine 2 (refer to FIG. 2) is loaded.

A transmission case 20 (refer to FIG. 2) is provided at the lower side of the step floor 40.

An HST case 10 (refer to FIG. 2) which houses an HST 11 (refer to FIG. 2) is provided at the front side of the transmission case 20.

Rotary motive force of the engine 2 is transmitted via the HST 11 to a speed-changing device of the inner part of the transmission case 20. And, the rotary motive force with speed-decreasing having been carried out at the said speed-changing device is transmitted to left and right front wheels 3L and 3R, and left and right rear wheels 4L and 4R.

Behind the engine 2, a steering handle 32 for carrying out steerage with the front wheels 3L and 3R is supplied.

Behind the steering handle 32, a driving seat 31 is provided.

At the vehicle-body rear part, a working machine (not shown) such as a rotary tilling device or the like is installed utilizing a mechanism such as a 3-point link mechanism or the like.

A hose cover 35 covers hoses which are joined to the steering handle 32.

On the step floor 40 at the left side of the operation column cover 33, brake pedals 50L and 50R (refer to FIG. 3) for performing braking with the rear wheels 4L and 4R in correspondence to a stepping-on operation of a worker are arranged.

On the step floor 40 at the right side of the operation column cover 33, a frontward/rearward movement pedal 60 for switching the frontward movement and rearward movement of the vehicle is arranged.

As will be mentioned in detail later, modulation of the HST trunnion opening-degree of the HST 11 is performed in correspondence to a stepping-on operation of the seesaw-type frontward/rearward movement pedal 60, and non-step speed-changing corresponding to frontward movement speed-increasing, neutrality and rearward movement speed-increasing is realized.

Next, mainly referring to FIGS. 2 and 6 to 9, descriptions are more specifically given regarding the configuration and action of the tractor of the present embodiment.

Figure 6:
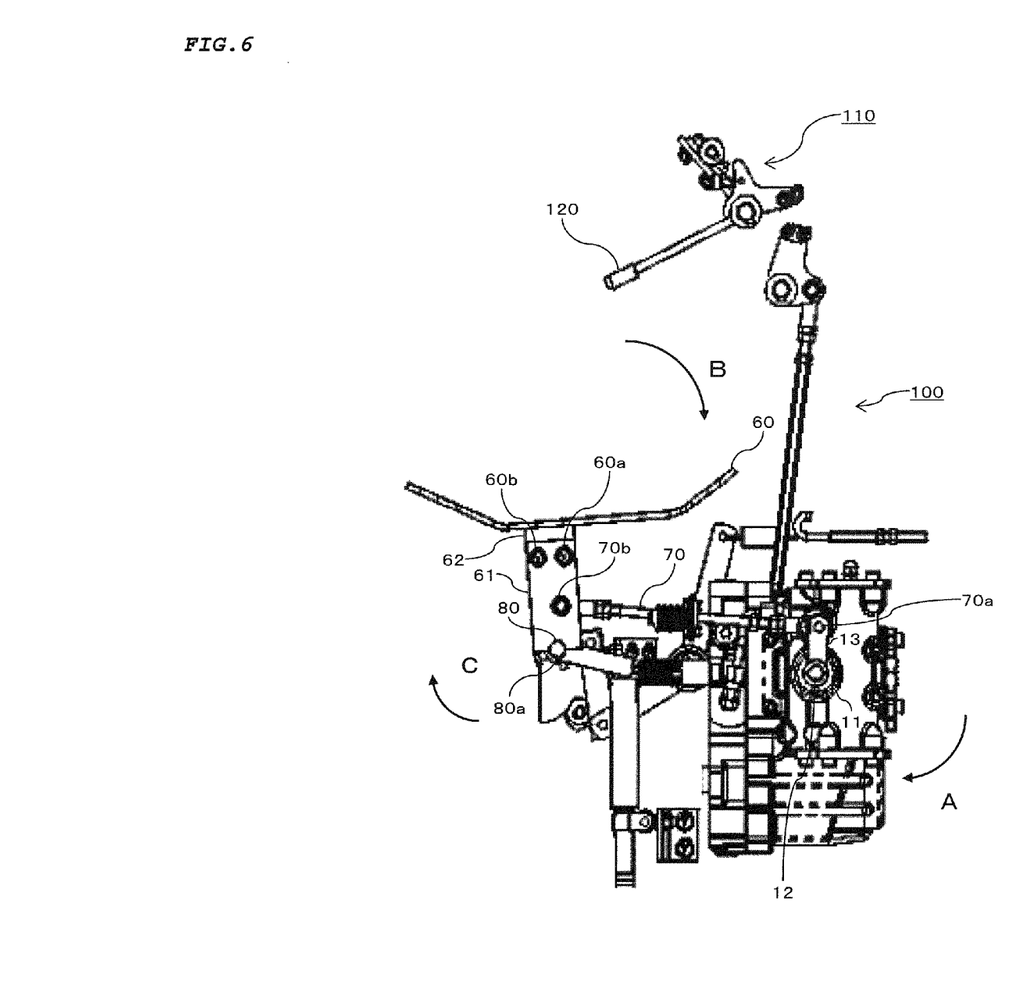
FIG. 6 is a partial right side view of the neighborhood of the step floor of the tractor of the embodiment in the present invention.
Figure 7:
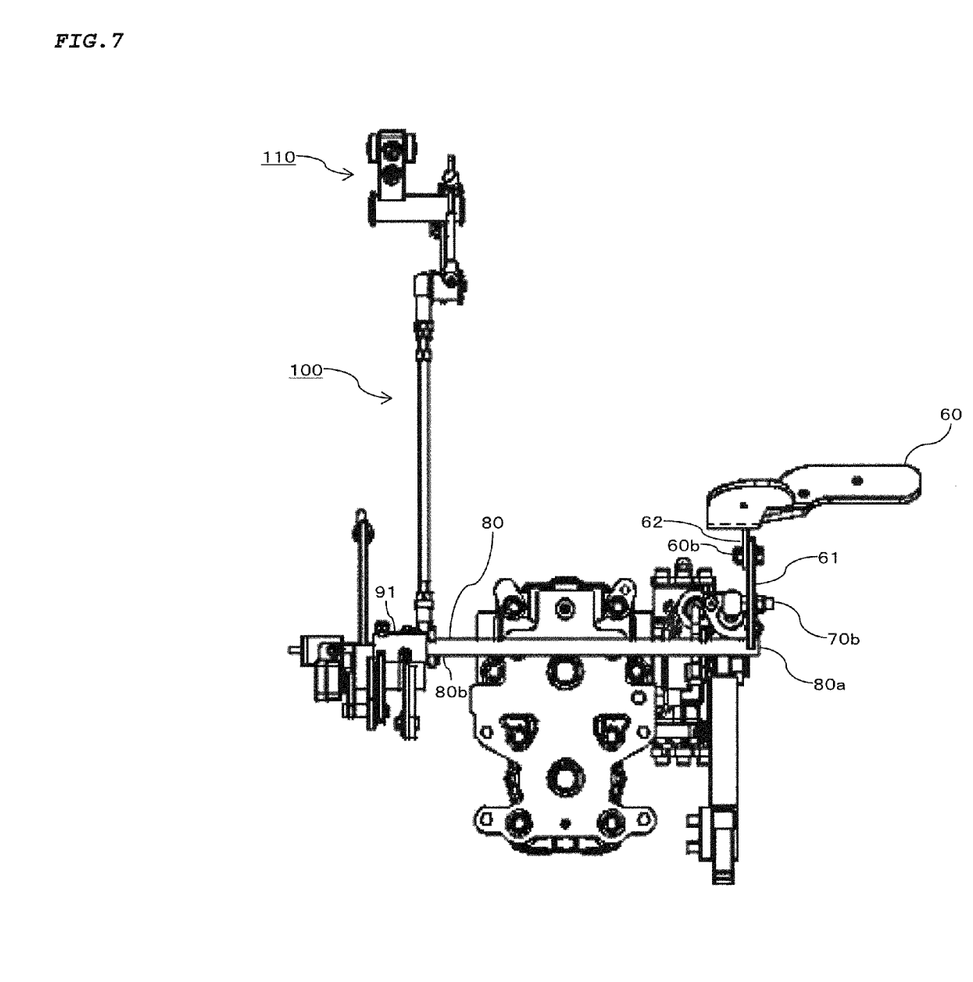
FIG. 7 is a partial rear view of the neighborhood of the step floor of the tractor of the embodiment in the present invention.
Figure 8:
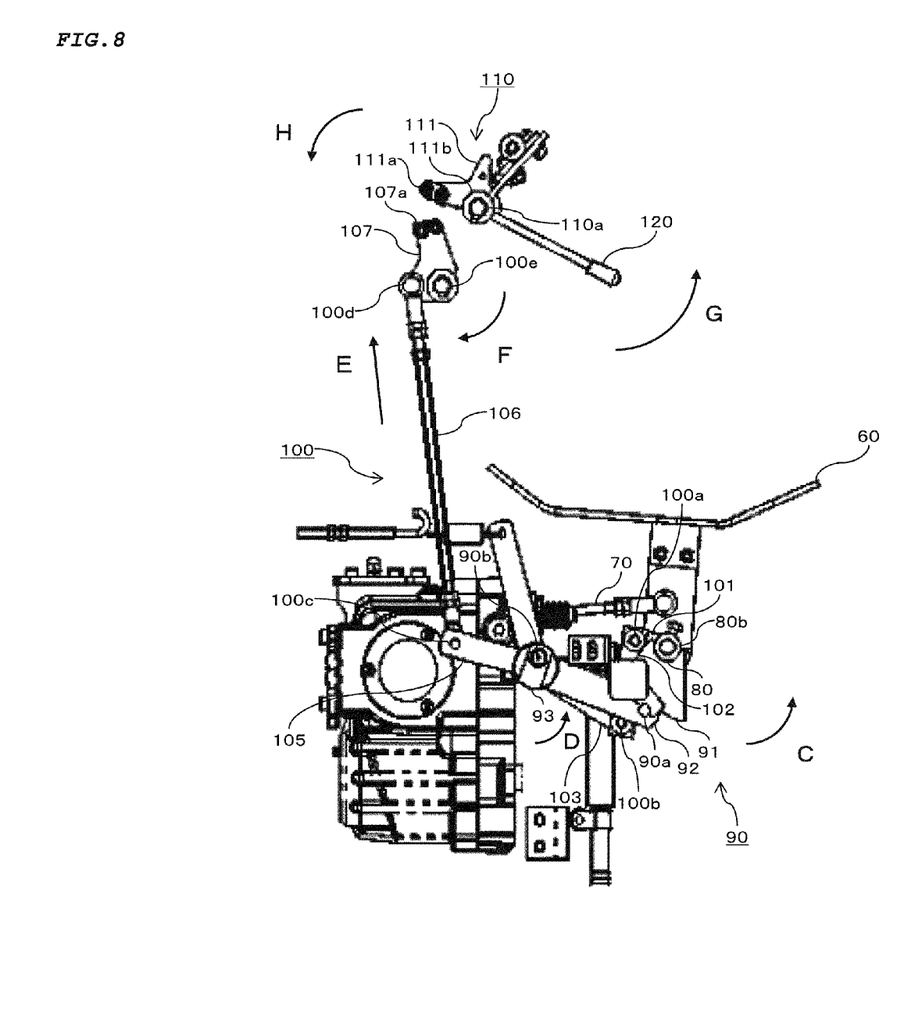
FIG. 8 is a partial left side view (No. 1) of the neighborhood of the step floor of the tractor of the embodiment in the present invention.
Figure 9:
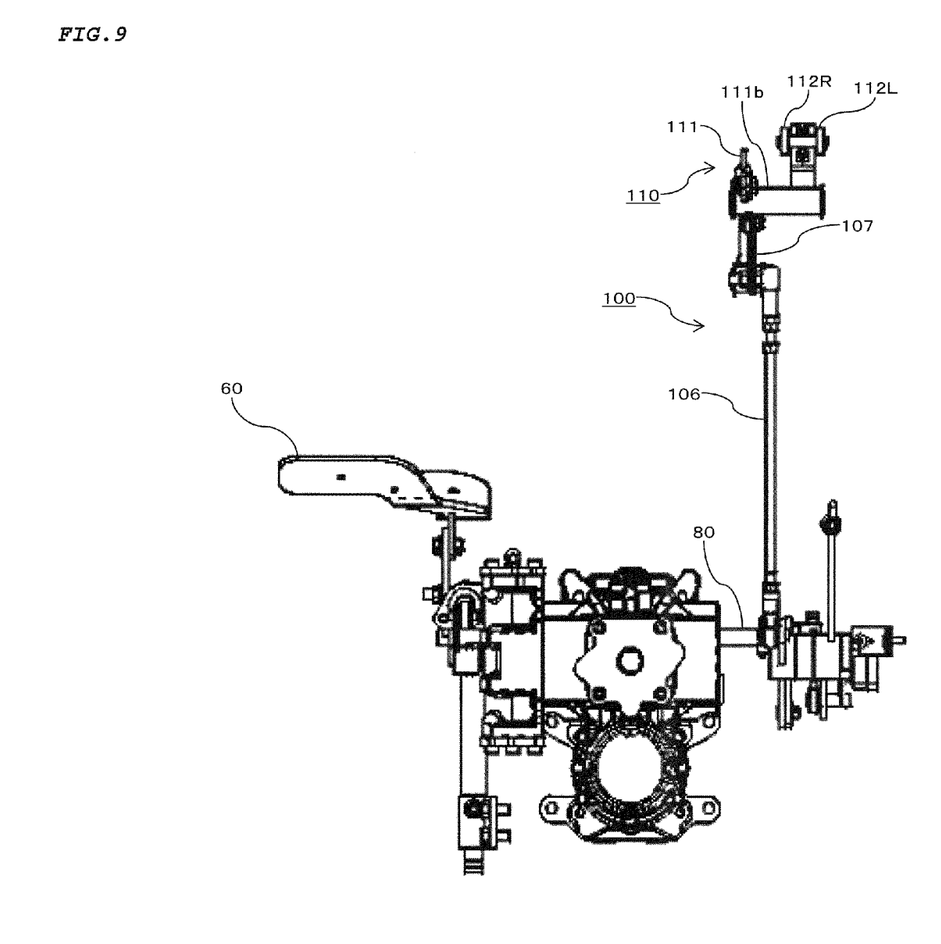
FIG. 9 is a partial front view of the neighborhood of the step floor of the tractor of the embodiment in the present invention.

Here, FIG. 6 is a partial right side view of the neighborhood of the step floor 40 of the tractor of the embodiment in the present invention, FIG. 7 is a partial rear view of the neighborhood of the step floor 40 of the tractor of the embodiment in the present invention, FIG. 8 is a partial left side view (No. 1) of the neighborhood of the step floor 40 of the tractor of the embodiment in the present invention, and FIG. 9 is a partial front view of the neighborhood of the step floor 40 of the tractor of the embodiment in the present invention.

Additionally, in FIGS. 6 to 9, not either the step floor 40, or the engine 2, the HST case 10, the transmission case 20 and the like are shown, so that descriptions in the following will become easier to understand.

For a start, mainly referring to FIGS. 6 and 7, descriptions are given regarding the HST 11, and the frontward/rearward movement pedal 60 which is connected to an HST trunnion shaft 12 of the HST 11.

An HST trunnion arm 13 is connected to an end part 12a (refer to FIG. 2) at the right side of the HST trunnion shaft 12.

The connection between the HST trunnion arm 13 and the end part 12a is fixedly performed.

A connection shaft 70 in the front-and-rear direction connects the HST trunnion arm 13 and a pedal base part 61 of the frontward/rearward movement pedal 60.

Like this, the connection shaft 70 is a single shaft, and the connection configuration of the HST trunnion arm 13 and the pedal base part 61 of the frontward/rearward movement pedal 60 is extremely simplified.

The connection between the connection shaft 70 and the HST trunnion arm 13 is rotatably performed utilizing a pin 70a, and the connection between the connection shaft 70 and the pedal base part 61 is rotatably performed utilizing a pin 70b.

The connection shaft 70 protrudes from the rear part of the HST case 10 to the rear, and passes the lateral of the transmission case 20 (refer to FIG. 2).

Like this, the connection configuration of the HST trunnion arm 13 and the pedal base part 61 of the frontward/rearward movement pedal 60 is realized with an extremely short distance.

A frontward/rearward movement pedal rotation-shaft 80 rotates in correspondence to swinging of the frontward/rearward movement pedal 60, and penetrates the transmission case 20 in the left-and-right direction (refer to FIG. 2).

Like this, the upper-part space of the inner part of the transmission case 20 is effectively utilized, and a compact machine-body layout is realized.

The connection between an end part 80a at the right side of the frontward/rearward movement pedal rotation-shaft 80 and the pedal base part 61 is fixedly performed.

A pedal stepping-on part 62 of the frontward/rearward movement pedal 60, to which a stepping-on operation by the right foot of the worker is performed, is connected to the pedal base part 61. The connection between the pedal base part 61 and the pedal stepping-on part 62 is fixedly performed utilizing bolts 60a and 60b.

Hereupon, in the pedal stepping-on part 62, a round hole the bolt 60a penetrates and a long hole the bolt 60b penetrates are provided, and the attachment angle of the pedal stepping-on part 62 to the pedal base part 61 is adjustable.

It is desirable that the posture of the HST trunnion plate (not shown) which is rotatable around the HST trunnion shaft 12 should, at the time when the posture of the pedal stepping-on part 62 is the horizontality posture, coincide with the neutrality posture for which the HST trunnion opening-degree is zero.

Accordingly, the connection state of the configuration elements mentioned above is adjusted so that the horizontality posture of the pedal stepping-on part 62 is compatible with the neutrality posture of the HST trunnion plate, that is to say the neutrality posture of the HST trunnion shaft 12.

When a pedal operation of the frontward/rearward movement pedal 60 is performed in the frontward direction which is the direction indicated with an arrow B, the rotation of the HST trunnion shaft 12 is performed in the direction indicated with an arrow A, and frontward movement speed-increasing is performed.

In contrast to the above-mentioned, when a pedal operation of the frontward/rearward movement pedal 60 is performed in the rearward direction which is the direction opposite to the direction indicated with the arrow B, the rotation of the HST trunnion shaft 12 is performed in the direction opposite to the direction indicated with the arrow A, and rearward movement speed-increasing is performed.

Thus, non-step speed-changing corresponding to frontward movement speed-increasing, neutrality and rearward movement speed-increasing, which is in correspondence to a stepping-on operation of the seesaw-type frontward/rearward movement pedal 60, is realized.

Subsequently, mainly referring to FIG. 8, descriptions are given regarding a neutrality posture adjustment-mechanism 90 for adjusting the neutrality posture of the HST trunnion shaft 12.

The neutrality posture adjustment-mechanism 90 has a hub 91, a neutrality plate 92 and an adjustment knob-member 93.

The connection between an end part 80b at the left side of the frontward/rearward movement pedal rotation-shaft 80 and the hub 91 is fixedly performed.

The connection between the hub 91 and the neutrality plate 92 is rotatably performed utilizing a pin 90a.

The connection between the neutrality plate 92 and the adjustment knob-member 93 is fixedly performed.

The adjustment knob-member 93 is rotatable with an adjustment fulcrum pin 90b as an eccentric fulcrum shaft.

When an adjustment rotation operation of the adjustment knob-member 93 by the worker is performed in the direction indicated with an arrow D, the rotation of the frontward/rearward movement pedal rotation-shaft 80 is performed in the direction indicated with an arrow C, and the rotation of the HST trunnion shaft 12 is performed in the direction indicated with the arrow A (refer to FIG. 6).

An adjustment rotation operation like this is effective in a case where the neutrality posture of the HST trunnion shaft 12 has shifted to the rearward movement speed-increasing side.

In contrast to the above-mentioned, when an adjustment rotation operation of the adjustment knob-member 93 by the worker is performed in the direction opposite to the direction indicated with the arrow D, the rotation of the frontward/rearward movement pedal rotation-shaft 80 is performed in the direction opposite to the direction indicated with the arrow C, and the rotation of the HST trunnion shaft 12 is performed in the direction opposite to the direction indicated with the arrow A (refer to FIG. 6).

An adjustment rotation operation like this is effective in a case where the neutrality posture of the HST trunnion shaft 12 has shifted to the frontward movement speed-increasing side.

Since shifting of the neutrality posture of the HST trunnion shaft 12 is not frequently generated, the neutrality posture adjustment-mechanism 90 is usually used at the time of building in a factory, or at the time of assembling after dismantling in maintenance after shipping.

It is desirable that, after an adjustment rotation operation of the adjustment knob-member 93 by the worker is completed, the attachment angle of the pedal stepping-on part 62 to the pedal base part 61 should be adjusted so that the horizontality posture of the pedal stepping-on part 62 is compatible with the neutrality posture of the HST trunnion shaft 12.

Subsequently, mainly referring to FIGS. 8 and 9, descriptions are given regarding a configuration for fixing the rotation angle of the frontward/rearward movement pedal rotation-shaft 80, namely, the rotation angle of the HST trunnion shaft 12 and letting the vehicle traveling-speed constant.

Of course, the positions where a joining plate 111 which is the joining part of a link mechanism fixation-member 110 abuts an upper-end plate 107 which is the upper-end part of a link mechanism 100 are, at a plurality of spots, correspondingly to the rotation angles of the HST trunnion shaft 12, continuously or discretely provided.

An arm 101 of the link mechanism 100 is connected to the end part 80b at the left side of the frontward/rearward movement pedal rotation-shaft 80.

More specific descriptions are given as follows.

Namely, the link mechanism 100 has the arm 101, a rod 102, a cruise plate 103, a rotation arm-member 104 (refer to FIG. 2), a plate 105, a rod 106 and the upper-end plate 107.

The connection between the end part 80b and the arm 101 is fixedly performed.

The connection between the arm 101 and the rod 102 is rotatably performed utilizing a pin 100a.

The connection between the rod 102 and the cruise plate 103 is rotatably performed utilizing a pin 100b.

The connection between the cruise plate 103 and the rotation arm-member 104 is fixedly performed.

The rotation arm-member 104 is rotatable with the adjustment fulcrum pin 90b as a fulcrum shaft.

Additionally, the rotation arm-member 104 and the adjustment knob-member 93 independently rotate individually in correspondence to rotation of the frontward/rearward movement pedal rotation-shaft 80, but the adjustment fulcrum pin 90b is a common fulcrum shaft of the rotation arm-member 104 and the adjustment knob-member 93, and the number of components is curtailed.

The connection between the rotation arm-member 104 and the plate 105 is fixedly performed.

The connection between the plate 105 and the rod 106 is rotatably performed utilizing a pin 100c.

The connection between the rod 106 and the upper-end plate 107 is rotatably performed utilizing a pin 100d.

The upper-end plate 107 is rotatable with a fulcrum pin 100e as a fulcrum shaft.

When a pedal operation of the frontward/rearward movement pedal 60 is performed in the frontward direction which is the direction indicated with the arrow B (refer to FIG. 6), the rotation of the frontward/rearward movement pedal rotation-shaft 80 is performed in the direction indicated with the arrow C, the sliding of the rod 106 is performed in the upward direction which is the direction indicated with an arrow E, and the rotation of the upper-end plate 107 is performed in the downward direction which is the direction indicated with an arrow F.

In contrast to the above-mentioned, when a pedal operation of the frontward/rearward movement pedal 60 is performed in the rearward direction which is the direction opposite to the direction indicated with the arrow B (refer to FIG. 6), the rotation of the frontward/rearward movement pedal rotation-shaft 80 is performed in the direction opposite to the direction indicated with the arrow C, the sliding of the rod 106 is performed in the downward direction which is the direction opposite to the direction indicated with the arrow E, and the rotation of the upper-end plate 107 is performed in the upward direction which is the direction opposite to the direction indicated with the arrow F.

The link mechanism fixation-member 110 has the joining plate 111 which selectively fixes the position of the upper-end plate 107 by selectively performing freely attachable and detachable link mechanism joining with the upper-end plate 107.

A link mechanism fixation-member operation lever 120 makes link mechanism joining be performed by making the joining plate 111 move in correspondence to an instruction of the worker.

More specific descriptions are given as follows.

Namely, the joining plate 111 has a toothed part 111a which performs link mechanism joining by meshing with a toothed part 107a of the upper-end plate 107.

A fulcrum hub 111b, to which the joining plate 111 is fixedly connected by welding or the like, is loosely fitted to a rotation-shaft 110a and is rotatable around the rotation-shaft 110a.

The connection between the fulcrum hub 111b and the link mechanism fixation-member operation lever 120 is fixedly performed.

When a lever operation of the link mechanism fixation-member operation lever 120 is performed in the upward direction which is the direction indicated with an arrow G, the rotation of the joining plate 111 is performed in the downward direction which is the direction indicated with an arrow H, and the link mechanism joining is executed.

In contrast to the above-mentioned, when at the time when link mechanism joining is being executed, a lever operation of the link mechanism fixation-member operation lever 120 is performed in the downward direction which is the direction opposite to the direction indicated with the arrow G, the rotation of the joining plate 111 is performed in the upward direction which is the direction opposite to the direction indicated with the arrow H, and the link mechanism joining is cancelled.

It may be allowed that the connection state of the configuration elements mentioned above is adjusted so that link mechanism joining is executable only at the time when frontward movement is being performed in correspondence to a stepping-on operation of the frontward/rearward movement pedal 60.

Additionally, it is desirable that the link mechanism fixation-member operation lever 120 should be rearward below the rotation-shaft 110a, and that the joining plate 111 should be frontward above the rotation-shaft 110a.

This is because at the time when a lever operation of the link mechanism fixation-member operation lever 120 has been performed in the upward direction, the rotation of the joining plate 111 is performed in the downward direction, and a configuration such that the toothed part 111a of the joining plate 111 presses down the toothed part 107a of the upper-end plate 107 from above is easily realized.

Moreover, it is desirable that the link mechanism fixation-member operation lever 120 should be provided, for example, in the neighborhood of the hose cover 35 which is at the machine-body left-and-right central part.

This is because not only does an operation of the link mechanism fixation-member operation lever 120, with the link mechanism fixation-member operation lever 120 being contiguous to the worker, become easy for the worker, but also, as will be mentioned later, a configuration such that link mechanism joining-cancellation bearings 112L and 112R (refer to FIG. 11) are contiguous to link mechanism joining-cancellation plates 131L and 131R (refer to FIG. 11) is easily realized.

Like this, since the auto-cruise function for which the fluctuation of the vehicle traveling-speed is suppressed is executed or cancelled not with a pedal operation by the foot, but by a lever operation by the hand, generation of a situation complicated for the worker where it is necessary to use both feet at the same time, for example, is suppressed.

Further regarding the configuration and action relating to the link mechanism fixation-member 110 and the link mechanism fixation-member operation lever 120, descriptions are given later together with the configuration and action relating to a link mechanism joining-cancellation mechanism 130.

Figure 10:
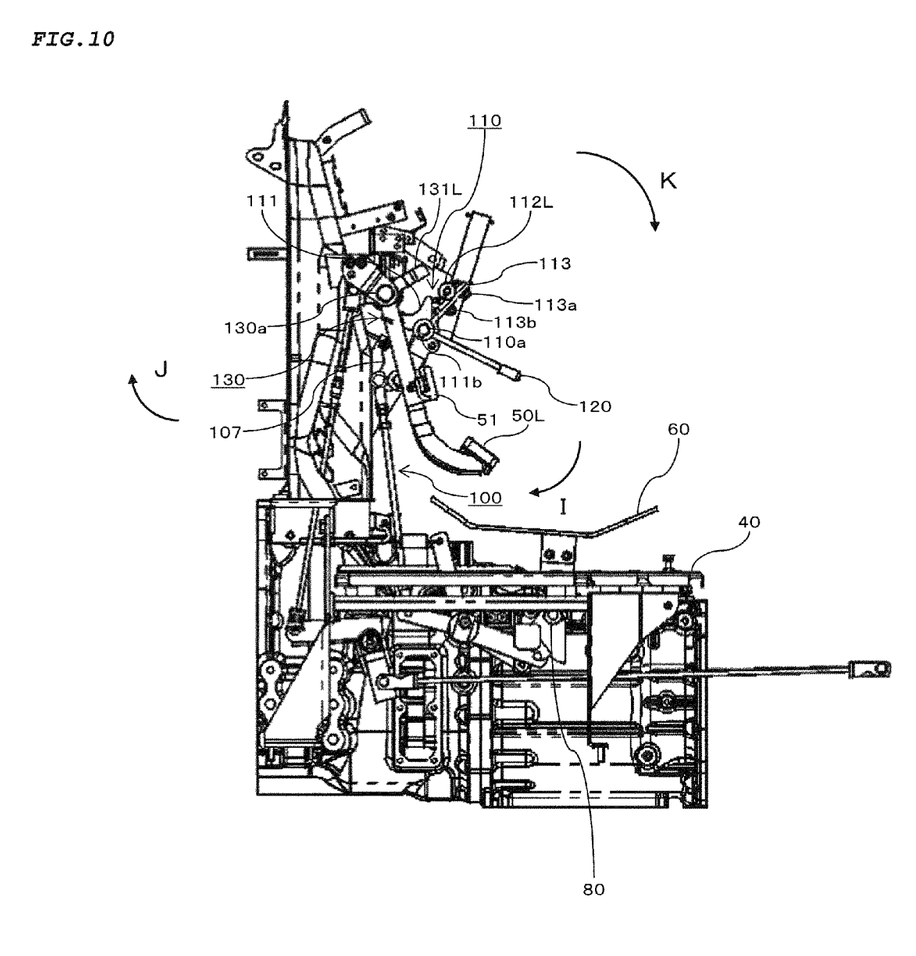
FIG. 10 is a partial left side view (No. 2) of the neighborhood of the step floor of the tractor of the embodiment in the present invention.
Figure 11:
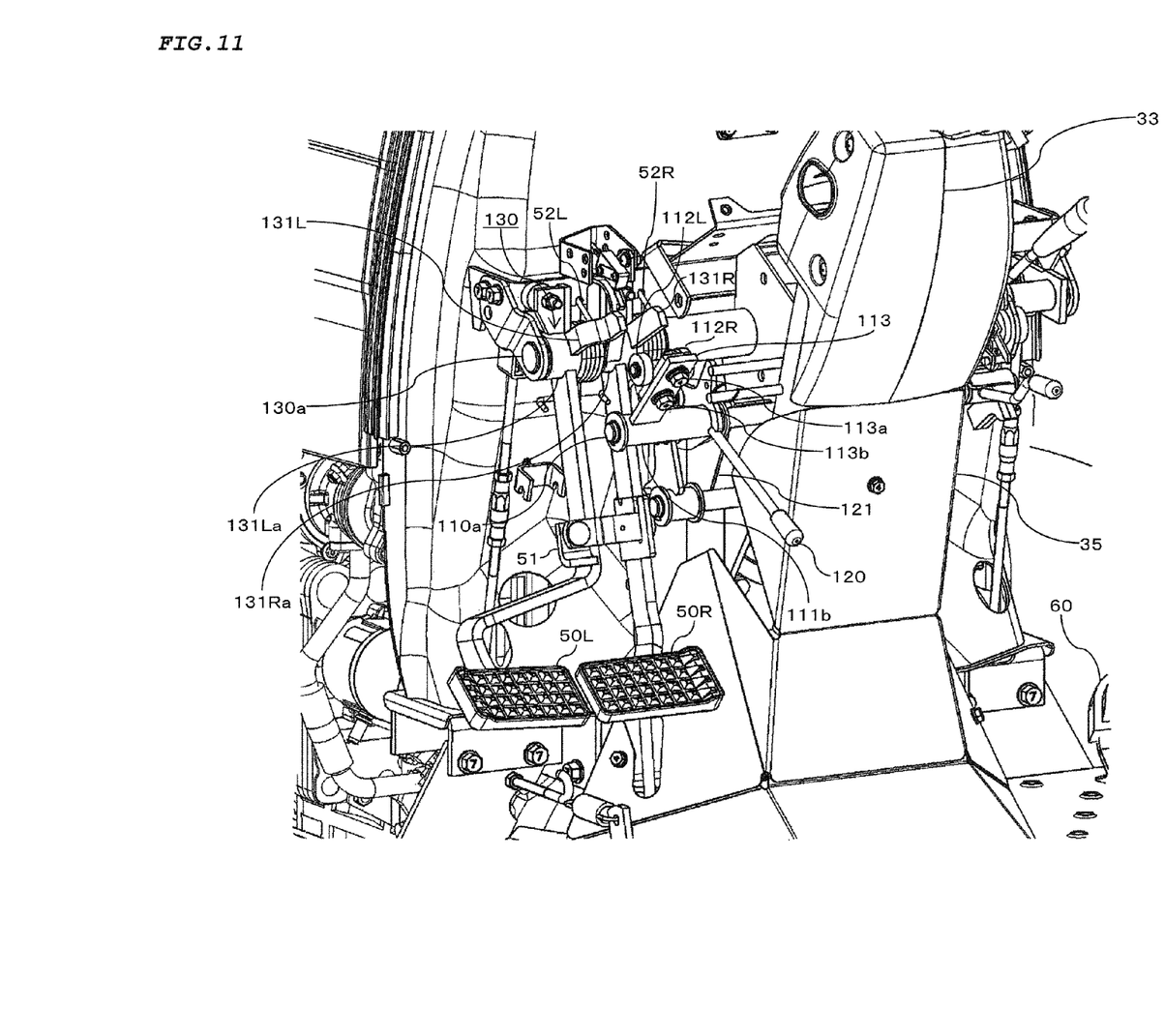
FIG. 11 is a partial perspective view (No. 2) of the neighborhood of the operation column cover of the tractor of the embodiment in the present invention.

Next, mainly referring to FIGS. 10 and 11, descriptions are still more specifically given regarding the configuration and action of the tractor of the present embodiment.

Here, FIG. 10 is a partial left side view (No. 2) of the neighborhood of the step floor 40 of the tractor of the embodiment in the present invention, and FIG. 11 is a partial perspective view (No. 2) of the neighborhood of the operation column cover 33 of the tractor of the embodiment in the present invention.

Additionally, in FIG. 11, a dash panel 34 (refer to FIG. 3) and the like are not shown, so that descriptions in the following will become easier to understand.

Descriptions are given regarding the link mechanism joining-cancellation mechanism 130 which cancels, in a case where link mechanism joining is being performed, the link mechanism joining at the time when stepping-on of at least one of the brake pedals 50L and 50R (refer to FIG. 11) has been performed.

The link mechanism joining-cancellation mechanism 130 has the link mechanism joining-cancellation plates 131L and 131R (refer to FIG. 11) as the first plate and the second plate, which move in correspondence to swinging of at least one of the brake pedals 50L and 50R and respectively abut the link mechanism joining-cancellation bearings 112L and 112R (refer to FIG. 11) of the link mechanism fixation-member 110.

That is to say, the link mechanism joining-cancellation mechanism 130 has, correspondingly to the two brake pedals 50L and 50R, the link mechanism joining-cancellation plates 131L and 131R.

And, the link mechanism fixation-member 110 has, correspondingly to the two brake pedals 50L and 50R, the link mechanism joining-cancellation bearings 112L and 112R as the first abutted part and the second abutted part, which are abutted by the link mechanism joining-cancellation plates 131L and 131R.

More specific descriptions are given as follows.

Namely, the link mechanism fixation-member 110 has the link mechanism joining-cancellation bearings 112L and 112R which are fixedly connected to the fulcrum hub 111b.

The attachment positions of the link mechanism joining-cancellation bearings 112L and 112R are, since the attachment of these are performed utilizing a plate 113, and bolts 113a and 113b, adjustable.

Fulcrum hubs 131La and 131Ra (refer to FIG. 11), to which the link mechanism joining-cancellation plates 131L and 131R are respectively fixedly connected by welding or the like, are loosely fitted to a rotation-shaft 130a and are individually rotatable around the rotation-shaft 130a.

Additionally, it is desirable that the rotation-shaft 130a and the rotation-shaft 110a should be roughly parallel, and that the distance between the rotation-shaft 130a and the rotation-shaft 110a should be not too large.

This is because the link mechanism joining-cancellation bearings 112L and 112R are contiguous to the link mechanism joining-cancellation plates 131L and 131R, and a configuration such that the lengths of the link mechanism joining-cancellation plates 131L and 131R become short is easily realized.

The connections between the fulcrum hubs 131La and 131Ra and the brake pedals 50L and 50R are respectively fixedly performed.

When a pedal operation of the brake pedal 50L is performed in the frontward direction which is the direction indicated with an arrow I, the rotation of the fulcrum hub 131La is performed in the direction indicated with an arrow J, and the rotation of the link mechanism joining-cancellation plate 131L is performed in the downward direction which is the direction indicated with an arrow K.

And, in a case where link mechanism joining is being performed, the link mechanism joining-cancellation plate 131L abuts the link mechanism joining-cancellation bearing 112L, the rotation of the joining plate 111 is performed in the upward direction which is the direction opposite to the direction indicated with the arrow H (refer to FIG. 8), and the link mechanism joining is cancelled.

In contrast to the above-mentioned, when a pedal operation of the brake pedal 50R is performed in the frontward direction which is the direction indicated with the arrow I, the rotation of the fulcrum hub 131Ra is performed in the direction indicated with the arrow J, and the rotation of the link mechanism joining-cancellation plate 131R is performed in the downward direction which is the direction indicated with the arrow K.

And, in a case where link mechanism joining is being performed, the link mechanism joining-cancellation plate 131R abuts the link mechanism joining-cancellation bearing 112R, the rotation of the joining plate 111 is performed in the upward direction which is the direction opposite to the direction indicated with the arrow H, and the link mechanism joining is cancelled.

Of course, in a case where the brake pedals 50L and 50R are connected by a brake pedal connector 51 (refer to FIG. 11), both of the brake pedals 50L and 50R swing at the time when stepping-on of at least one of the brake pedals 50L and 50R has been performed.

Additionally, it is desirable that the brake pedals 50L and 50R should be rearward below the rotation-shaft 130a, and that the rotation-shaft 130a should be frontward above the rotation-shaft 110a.

This is because, for example, at the time when a pedal operation of the brake pedal 50L has been performed in the frontward direction, the rotation of the link mechanism joining-cancellation plate 131L is then performed in the downward direction, and a configuration such that abutting is performed so that the link mechanism joining-cancellation plate 131L presses down the link mechanism joining-cancellation bearing 112L from above is easily realized.

If a configuration such that the link mechanism joining-cancellation bearing 112L which has been abutted by the link mechanism joining-cancellation plate 131L rotates is adopted, since the shock by the abutting is moderated, the link mechanism joining is smoothly cancelled, which is more desirable.

Like this, at the time when the auto-cruise function is being executed, it is not necessary to use the right foot for a pedal operation of the frontward/rearward movement pedal 60 and, since the auto-cruise function can be cancelled only by using the left foot for a pedal operation of at least one of the brake pedals 50L and 50R, generation of a situation where it is necessary to use both feet at the same time is suppressed.

Automatic cancellation of the auto-cruise function accompanying a pedal operation of at least one of the brake pedals 50L and 50R is not a prerequisite measure.

However, it is more desirable from a viewpoint of safety and the like that, on the occasion of a pedal operation of the brake pedals 50L and 50R which is sometimes performed for the purpose of emergency stopping or the like, if the auto-cruise function is being executed, the very auto-cruise function being executed should be cancelled.

In the present embodiment, on the occasion of a pedal operation of at least one of the brake pedals 50L and 50R, since automatic cancellation of the auto-cruise function is performed, it is not necessary for the worker to expressly perform a lever operation of the link mechanism fixation-member operation lever 120 for canceling the auto-cruise function.

Of course, if the worker performs as necessary a lever operation of the link mechanism fixation-member operation lever 120 for executing link mechanism joining, the auto-cruise function is again executed.

Additionally, since energization by a return spring 121 (refer to FIG. 11) is being performed toward the link mechanism fixation-member operation lever 120, when link mechanism joining is cancelled, the link mechanism fixation-member operation lever 120 returns to the initial position.

Moreover, since energizations by return springs 52L and 52R (refer to FIG. 11) are respectively being performed toward the brake pedals 50L and 50R, when a pedal operation becomes not performed, the brake pedals 50L and 50R return to the initial positions.

Like this, with an extremely simplified configuration, the auto-cruise function can be cancelled only by performing a pedal operation of at least one of the two brake pedals 50L and 50R.

Additionally, in the present embodiment, the frontward/rearward movement pedal 60 and the HST trunnion arm 13 are provided at the right side of the step floor 40, and the link mechanism 100 and the brake pedals 50L and 50R are provided at the left side of the step floor 40.

However, regarding a configuration like this, it may be allowed that the left and the right are entirely exchanged.

That is to say, it may be allowed that the frontward/rearward movement pedal 60 and the HST trunnion arm 13 are provided at the left side of the step floor 40, and that the link mechanism 100 and the brake pedals 50L and 50R are provided at the right side of the step floor 40.

Moreover, the auto-cruise function of the present embodiment is also cancelled with, besides a stepping-on operation of the brake pedals 50L and 50R, a stepping-on operation of the frontward/rearward movement pedal 60 to the frontward movement side, namely, an operation to the speed-increasing side. Namely, during the auto-cruise, when the frontward/rearward movement pedal 60 is stepped on to the frontward movement side, the link mechanism acts, and the joining between the joining plate 111 and the upper-end plate 107 is cancelled.

Additionally, for the present embodiment, during the auto-cruise, the auto-cruise function is not cancelled even when the frontward/rearward movement pedal is stepped on to the rearward movement side, while the auto-cruise function is cancelled with the link mechanism acting when the frontward/rearward movement pedal is stepped on to the frontward movement side, but detailed descriptions of the operativeness concerned are omitted.

A tractor in the present invention is such that cancellation of the auto-cruise function is able to be performed with a simpler operation, and is useful for the purpose of utilizing for a tractor which performs working inside a farm field, for example.

What is claimed is:

1. A tractor, comprising:

an HST;

a frontward/rearward movement pedal which is connected to an HST trunnion shaft of the HST;

a link mechanism;

a frontward/rearward movement pedal rotation-shaft which, with both end parts of the frontward/rearward movement pedal rotation-shaft being respectively connected to the frontward/rearward movement pedal and the link mechanism, rotates in correspondence to swinging of the frontward/rearward movement pedal;

a link mechanism fixation-member which regulates rotation of the HST trunnion shaft by abutting the link mechanism;

a link mechanism fixation-member operation lever which makes the link mechanism fixation-member abut the link mechanism, or makes the link mechanism fixation-member move in a direction so as to get apart from the link mechanism;

a brake pedal; and a link mechanism joining-cancellation mechanism which makes, in a case where the link mechanism fixation-member is abutting the link mechanism, the link mechanism fixation-member move in a direction so as to get apart from the link mechanism when stepping-on of the brake pedal is performed, wherein the link mechanism joining-cancellation mechanism comprises a link mechanism joining-cancellation plate which makes, by abutting the link mechanism fixation-member, the link mechanism fixation-member move in a direction so as to get apart from the link mechanism when stepping-on of the brake pedal is performed, the brake pedal comprises a left brake pedal which corresponds to a brake of a vehicle-wheel at a left side, and a right brake pedal which corresponds to a brake of a vehicle-wheel at a right side, and the link mechanism joining-cancellation plate comprises a first plate corresponding to the left brake pedal, and a second plate corresponding to the right brake pedal.

2. The tractor according to claim 1, wherein the link mechanism fixation-member comprises an abutted part which is abutted by the link mechanism joining-cancellation plate, and the abutted part comprises a first abutted part which is abutted by the first plate, and a second abutted part which is abutted by the second plate.

3. A tractor comprising:

an HST;

a frontward/rearward movement pedal which is connected to an HST trunnion shaft of the HST, and is provided at one side of left-and-right sides of a step floor;

a link mechanism which is provided at other side of the left-and-right sides of the step floor;

a frontward/rearward movement pedal rotation-shaft which extends in a left-and-right direction below the step floor, with both end parts of the frontward/rearward movement pedal rotation-shaft being respectively connected to the frontward/rearward movement pedal and the link mechanism, and rotates in correspondence to swinging of the frontward/rearward movement pedal;

a link mechanism fixation-member which regulates rotation of the HST trunnion shaft by abutting the link mechanism;

a link mechanism fixation-member operation lever which makes the link mechanism fixation-member abut the link mechanism, or makes the link mechanism fixation-member move in a direction so as to get apart from the link mechanism;

a brake pedal which is provided at the other side of the left-and-right sides of the step floor; and a link mechanism joining-cancellation mechanism which makes, in a case where the link mechanism fixation-member is abutting the link mechanism, the link mechanism fixation-member move in a direction so as to get apart from the link mechanism when stepping-on of the brake pedal is performed, wherein the link mechanism joining-cancellation mechanism comprises a link mechanism joining-cancellation plate which makes, by abutting the link mechanism fixation-member, the link mechanism fixation-member move in a direction so as to get apart from the link mechanism when stepping-on of the brake pedal is performed, the brake pedal comprises a left brake pedal which corresponds to a brake of a vehicle-wheel at a left side, and a right brake pedal which corresponds to a brake of a vehicle-wheel at a right side, and the link mechanism joining-cancellation plate comprises a first plate corresponding to the left brake pedal, and a second plate corresponding to the right brake pedal.

4. The tractor according to claim 3, wherein the link mechanism fixation-member, the link mechanism fixation-member operation lever, and the link mechanism joining-cancellation mechanism are provided at the other side of the left-and-right sides of the step floor.

5. The tractor according to claim 4, wherein the link mechanism fixation-member comprises an abutted part which is abutted by the link mechanism joining-cancellation plate, and the abutted part comprises a first abutted part which is abutted by the first plate, and a second abutted part which is abutted by the second plate.

6. The tractor according to claim 3, wherein the link mechanism fixation-member comprises an abutted part which is abutted by the link mechanism joining-cancellation plate, and the abutted part comprises a first abutted part which is abutted by the first plate, and a second abutted part which is abutted by the second plate.

* * * * *